Patented Feb. 27, 1951

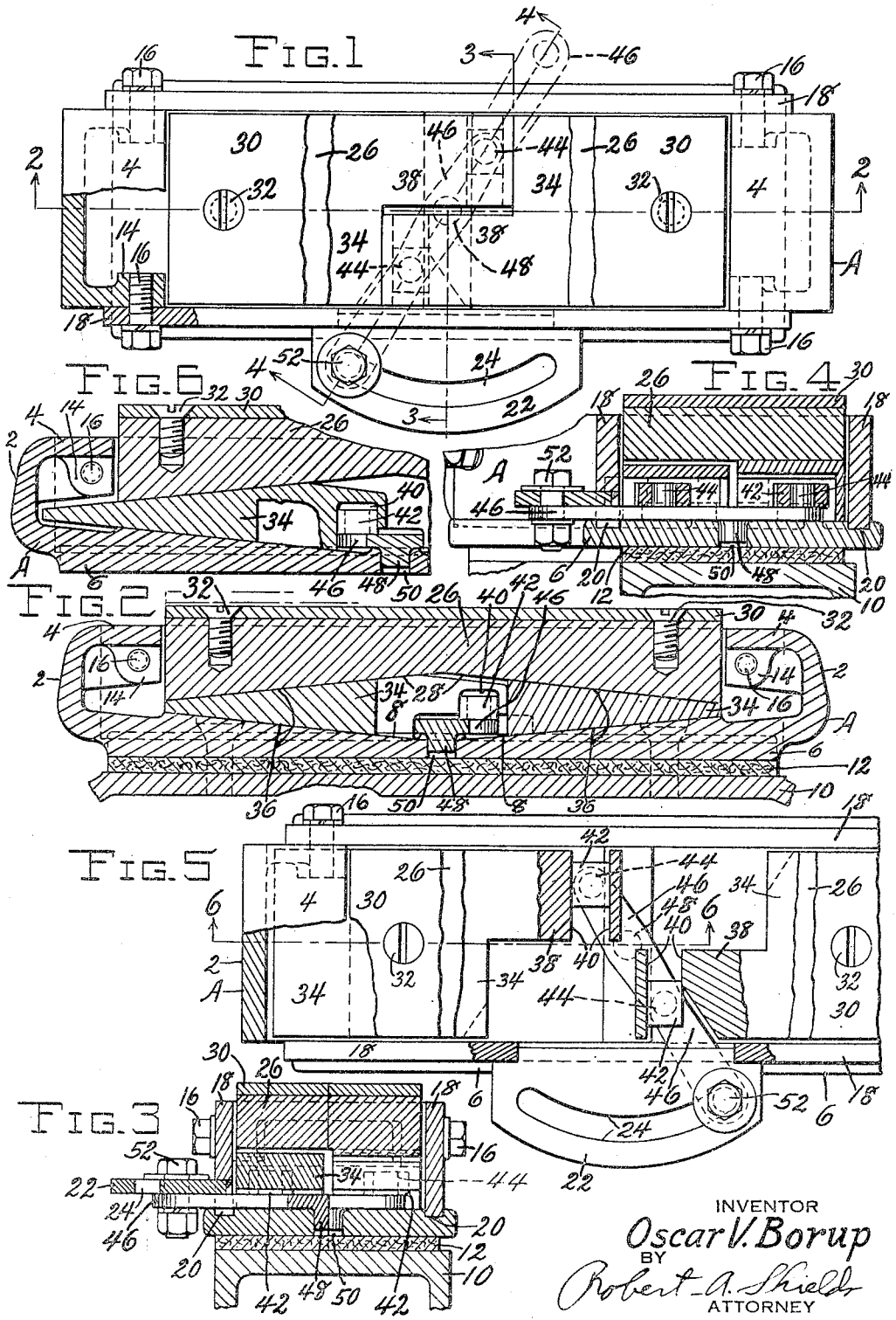

2,543,484

UNITED STATES PATENT OFFICE 2,543,484

ADJUSTABLE SIDE BEARING

Oscar V. Borup, Bloomsburg, Pa., assignor to American Car and Foundry Company, New York, N. Y., a corporation of New Jersey Application March 24, 1948, Serial No. 16,732

6 Claims. (Cl. 308—138)

This invention relates to side bearings in general and in particular to adjustable side bearings for use on railway truck bolsters.

Due to inequalities in fabrication of the car body center plate and bolsters, as well as in the truck bolsters, it has been necessary to always adjust the clearance between the side bearings upon completion of a car. With the present type side bearing the body has to be mounted on the truck, the clearance measured and then the body lifted off the trucks and shims inserted in the bearing pocket. This same procedure has to be followed in cases where clearances have increased due to center plate wear or bolster deflection. It is an object, therefore, of the present invention to provide a side bearing which can be readily adjusted at any time and without removal of the body from the truck.

A further object of the invention is the provision of an adjustable side bearing having a plurality of wedges simultaneously adjustable by a single lever.

A still further object of the invention is the provision of an adjustable side bearing having the adjustment accomplished through inclined surfaces disposed at such an angle that the horizontal component is less than the friction along the surface.

These and other objects of the invention will be apparent to persons skilled in the art from a study of the following description and accompanying drawings, in which Fig. 1 is a plan view of the improved side bearing with parts broken away to better disclose the construction;

Fig. 2 is a sectional view taken substantially on line 2—2 of Fig. 1

Fig. 3 is a sectional view taken substantially on line 3—3 of Fig 1;

Fig. 4 is a sectional view taken substantially on line 4—4 of Fig. 1;

Fig. 5 is a plan view of the improved side bearing with parts in their fully raised position, and Fig. 6 is a sectional view taken substantially on line 6—6 of Fig. 5.

Referring now to the drawings in detail it will be seen that the side bearing is mounted in a housing A, which housing is formed with end pieces 2 extending upwardly and inwardly as at 4. The base portion 6 of the housing is formed on its interior with upwardly and outwardly diverging inclined surface 8. Holes are provided through the base portion by means of which fastening devices, such as countersunk rivets may be used to secure the housing A to the truck bolster 10. As is customary, a sound-deadening pad 12 will be interposed between the housing and the truck bolster. The sides of inwardly directed ends 4 are thickened to provide bosses 14 adapted to be threaded for reception of bolts 16, which bolts securely fasten removable side pieces 18 to the end pieces of the housing A. In order to retain the lower edge of the side pieces 18 in place, they are adapted to fit into grooves 20 formed in the housing base, as best shown in Fig. 3. It is to be understood that if desired these side pieces may be formed integral with the base or housing. One of the side pieces 18, as best shown in Fig. 3, has its lower central part cut away so as to receive a plate 22 which is welded to the side piece 18 in the opening and is provided with an arcuate slot 24 for a purpose later to be referred to.

Mounted within the housing between the ends 4 and the side pieces 18 is a shoe member 26 having its lower surface formed with downwardly and outwardly inclined surfaces 28. The upper surface of the shoe is preferably flat and has a wear resisting plate 30 fastened thereto by means of countersunk bolts 32. Interposed between the shoe and base is a pair of identical wedge members 34, each having inwardly divergent inclined surfaces 36 adapted to cooperate with the inclined surfaces 8 and 28 of the housing and shoe respectively. The wedges are of generally L shape in plan with the legs 38 of the L overlapping each other in the central area of the bearing. The lower surface of the legs 38 is former with a downwardly open slot 40 in which a square slide 42 is adapted to move. Each square slide is provided with a central opening adapted to fit over a pin 44 projecting upwardly from an arm 46. This arm is provided intermediate the upwardly projecting pins 44 with a downwardly projecting pin 48 adapted to be journaled in a hole 50 formed in the base of the housing A. The arm 46 extends laterally downwardly through the slot in the side piece and is provided adjacent its outer end with a hole for reception of a bolt 52 extending through the arm and through the slot 24 of plate 22.

In assembling the side bearing the housing will be riveted or otherwise attached to the bolster, after which the lever 46 will be placed in position and the slides 42 dropped over the pins 44. Next the wedges 34 can be dropped into position and the shoe 26 with its attached wear plate lowered on top of the wedges. With the lever 46 in the position as shown in Fig. 1 the wedges will be retracted and the shoe will accordingly be at its lowest adjusted position. Swinging the lever 46 to the position of Fig. 5 will cause the wedges to be simultaneously separated, thus forcing the shoe to rise to its proper adjusted position. It is obvious that with the sides 18 removable, as shown, new shoes and wedges may be inserted without removal of the body from the truck. With certain railroads this feature may not be important, in which case the sides may be formed integral with the base without in any way affecting the adjustability of the bearing.

As shown in the drawings the inclined surfaces 8, 28 and 36 are so inclined that the friction along the incline is greater than the horizontal component, thus the pressure of the car body acting downwardly on wear plate 36 will not tend to force the wedges 34 inward toward each other. By having the surfaces inclined as shown, the wedges will readily keep their adjusted position and excessive strains can not be transmitted to the slides 42 or pins 44 of the adjusting lever 46. In other words, the lever and slides are used principally for adjusting and do not have to take any heavy thrusts incident to application of load on the shoe 26 and wear plate 30.

While the construction has been described more or less in detail with specific reference to the accompanying drawings, it is obvious that various modifications and rearrangements may be made without departing from the scope of the invention as defined by the following claims.

1. An adjustable side bearing for railway cars comprising a housing member having a bottom and upstanding end pieces, side pieces removably secured to the end pieces and interlocking with said bottom, inclined surfaces formed on the upper face of said bottom and being inclined upwardly and outwardly toward said end pieces, a double tapered wedge resting on each inclined surface, a shoe positioned in said housing member between said end and side pieces and having its lower surface formed with inclined surfaces each resting on a wedge and being inclined outwardly and downwardly toward said end pieces, and means for simultanteously moving said double tapered wedges horizontally whereby said shoe will be shifted vertically, said means comprising a lever pivoted to said housing and pivotally and slidably connected to each double tapered wedge.

2. An adjustable side bearing for railway cars comprising a housing member having a bottom and upstanding end pieces, side pieces removably secured to the end pieces and interlocking with said bottom, inclined surfaces formed on the upper face of said bottom and being inclined upwardly and outwardly toward said end pieces, a double tapered wedge resting on each inclined surface, each wedge being L-shaped in plan with the legs of the L overlapping each other, a lever pivoted to said housing centrally thereof and extending laterally outward of one of said side pieces, slides pivotally mounted on said lever and adapted to engage slots formed in the legs of each L-shaped wedge, a shoe positioned in said housing and having its lower surface inclined to cooperate with said double tapered wedges and rest thereon, said shoe being vertically adjustable upon swinging of said lever and connected wedges, and means for clamping said lever in any predetermined shoe adjusting position.

3. An adjustable side bearing for railway cars comprising a housing member having a bottom and upstanding end pieces, side pieces joining said end pieces and bottom and interlocking with said bottom, inclined surfaces formed on the upper face of said bottom and being inclined upwardly and outwardly from the center toward said end pieces, a double tapered wedge resting on each inclined surface and having the thickest portion positioned adjacent the center of the housing, a shoe positioned in said housing member between said end and side pieces and having its lower surface formed with inclined surfaces each resting on a wedge and being inclined outwardly and downwardly from the center toward said end pieces, and means for simultaneously moving said double tapered wedges horizontally whereby said shoe will be shifted vertically.

4. An adjustable side bearing for railway cars comprising an upwardly open housing member, a pair of double tapered wedges located within the housing and reciprocable relative to each other, and a shoe located within the housing and resting on said wedges, said housing and shoe being formed with inclined surfaces corresponding to the wedge surfaces, said surfaces diverging toward the center of the side bearing whereby vertical pressure tends to retain the wedges within the housing.

5. An adjustable side bearing for railway cars comprising an upwardly open housing member, a pair of double tapered wedges located within the housing and reciprocable relative to each other, and a shoe located within the housing and resting on said wedges, said housing and shoe being formed with inclined surfaces corresponding to the wedge surfaces, said inclined surfaces being formed on an angle such that the horizontal components of a vertical force applied to the shoe is less than the friction along the surfaces and are directed toward each other.

6. An adjustable side bearing for railway cars comprising an upwardly open housing member, a pair of double tapered wedges located within the housing and reciprocable relative to each other, a lever pivoted to the housing and extending laterally outward therof, slidable connections between said lever and each double tapered wedge, means to hold said lever in a plurality of predetermined positions, and a shoe located within the housing and resting on said wedges, said housing and shoe being formed with inclined surfaces corresponding to the wedge surfaces whereby said shoe will be adjusted vertically upon movement of said lever.

OSCAR V. BORUP.

REFERENCES CITED

The following references are of record in the file of this patent:

UNITED STATES PATENTS

| Number | Name | Date |
| --- | --- | --- |
| 1,037,511 | Norell | Sept. 3, 1912 |